United States Patent [19]
Lecailtel

[11] 3,867,053
[45] Feb. 18, 1975

[54] DEVICES FOR POSITIONING MOVABLE MEMBERS OF NUMERICALLY CONTROLLED MACHINES

[75] Inventor: Pierre Lecailtel, Billancourt, France

[73] Assignees: Regie Nationale des Usines Renault, Billancourt; Automobiles Peugeot, Paris, both of, France

[22] Filed: Jan. 12, 1973

[21] Appl. No.: 323,120

[30] Foreign Application Priority Data
Jan. 20, 1972  France .............................. 72.01891

[52] U.S. Cl. .................... 408/13, 83/368, 408/70
[51] Int. Cl. .................... B23b 39/04, B26d 5/02
[58] Field of Search ......... 408/3, 13, 69, 70; 83/368

[56] References Cited
UNITED STATES PATENTS
| | | | |
|---|---|---|---|
| 1,046,394 | 12/1912 | Kolassa | 408/13 |
| 3,094,015 | 6/1963 | Mead | 408/3 |
| 3,253,484 | 5/1966 | Hill | 408/13 |

*Primary Examiner*—Andrew Juhasz
*Attorney, Agent, or Firm*—Stevens, Davis, Miller & Mosher

[57] ABSTRACT

This device for positioning movable member of machine-tools, notably spindles, in numerically controlled machines, especially those employed for machining relatively long workpieces such as sections of frameworks or the longitudinal girders or beams of vehicle chassis, comprises means for changing from one reference face to another for performing a machining operation in a selected area of said workpiece, means for memorizing the selected origins for performing a first machining operation and means permitting of truly following the contour of said workpiece.

7 Claims, 10 Drawing Figures

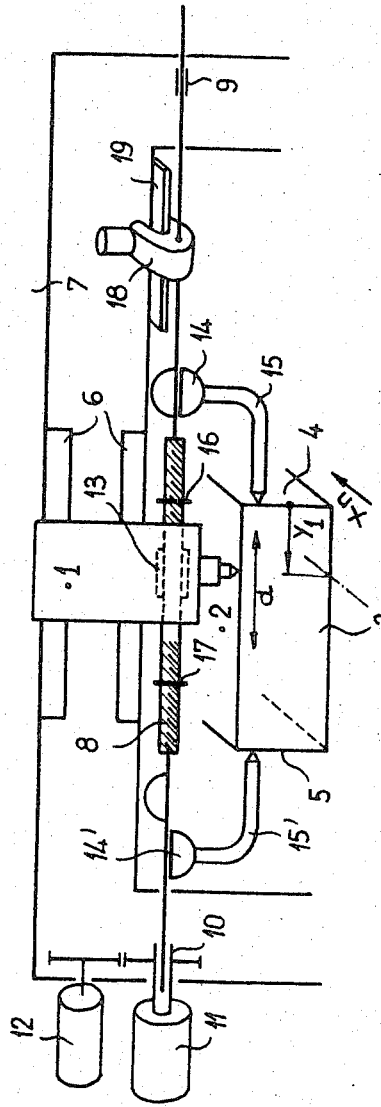
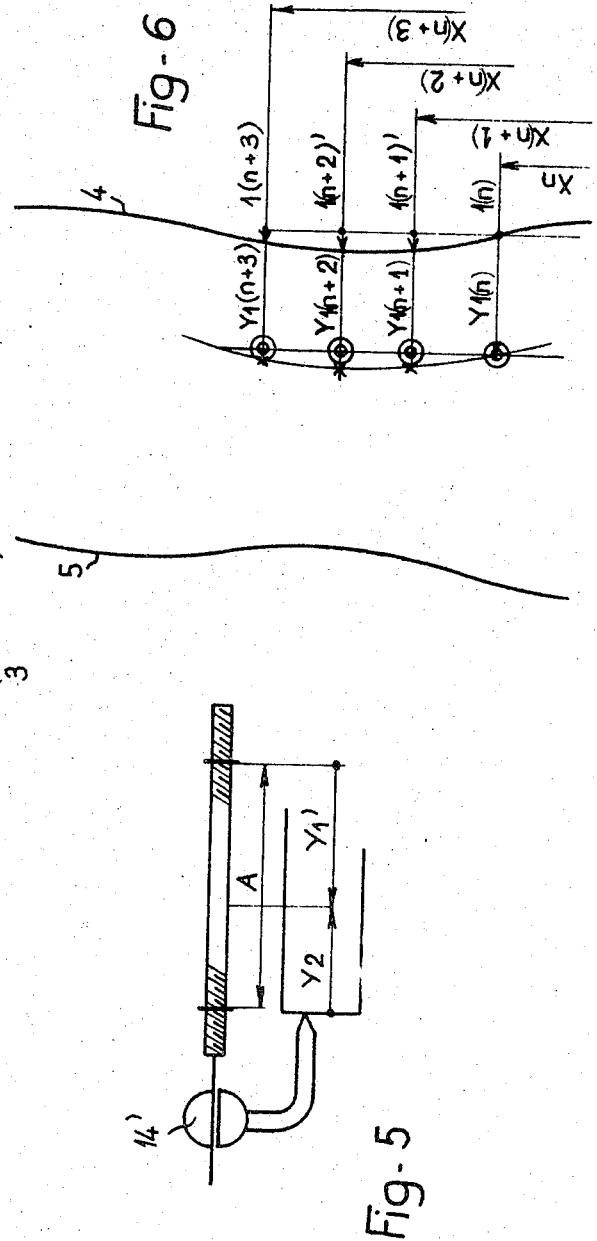

DEVICES FOR POSITIONING MOVABLE MEMBERS OF NUMERICALLY CONTROLLED MACHINES

The present invention relates to a device for positioning movable members, notably machining spindles, in numerically-controlled machines, notably those utilized for machining relatively long workpieces such as section members of frameworks or the longitudinal members of vehicle chassis.

The numeric control system is particularly adequate for many machining and multiple drilling operations to be carried out on relatively large workpieces in small or medium series. The use of different programmes will thus permit of machining a great variety of workpieces on a same machine.

Among the hitherto known devices for automatically controlling the positioning and machining of such elongated workpieces by using a pre-recorded programme, reference may be made to the device comprising a slide or carriage driven in synchronism with the section member or workpiece to be machined and pulling a tape on which the machining programme is recorded in the form of successive groups or signs, such as perforations, the gap between adjacent groups of signs of said tape corresponding to the longitudinal distance or relative spacing between two machining operations to be performed in succession, each group of marks, which corresponds to an elementary machining programme, comprising a stop mark co-acting with a fixed-stop pick-up or reading unit for stopping the section or workpiece in a longitudinal machining position corresponding to the relative position of said stop mark on the programme-carrying tape, and one or several machining control marks formed at predetermined locations along the tape and each adapted to co-act with a machining control pick-up or reading unit associated with a machining unit of the machine, said pick-up unit being adapted, when detecting a corresponding mark on said tape, to control the proper positioning, in the transverse direction, of the machining unit associated therewith, and the machining operation proper to be performed by said lastnamed unit.

The machine tool concerned is genrally of the type comprising on the one hand a gantry arranged to surround the beam, section or longitudinal member to be machined, and on the other hand means whereby a frame structure supporting a vertical machining unit is guided with a view to cause this unit to travel and be positioned in the transverse direction with respect to said beam or like workpiece. In this case, the reference plane is the right-hand or left-hand side surface of the beam, if it is desired for example to drill the top face of the beam.

A first object of this invention is to permit the change from one reference face to another in case certain machining operations must be located with reference to the right-hand side surface, while other machining operations must be located with reference to the left-hand side surface.

Furthermore, this invention is concerned with the memorization of anyone of the origins selected for performing the first one of a series of machining operations from a lateral reference surface. The scope of the memory device thus employed is based on the necessity of coping with the irregularities that may exist on the side faces of the beam as a consequence of the pressing or drawing thereof, said irregularities or unevennesses having a detrimental influence on the proper alignment of the machining operations performed on the upper surface of the beam and being likely to interfere with the assembling thereof with another workpiece machined without any error or with different errors.

To this end, it is only necessary to use the reference $1(n)$ only for the first machining operation $(n)$; for the next machining operations the references $1(n+1)'$, $1(n+2)'$, and so on, after memorizing $1(n)$.

The same applies to reference 2.

Another object of this invention is to permit the maintaining of an accurate transverse contact along a workpiece such as a longitudinal beam or girder of relatively great length, not rectilinear and having a variable cross-sectional contour, this contact taking place under a pressure as high as necessary or desired. Up to now it was assumed that such members were distortionfree. Now, this is not true and it is accordingly a specific object of the present invention to permit an accurate machining thereof while avoiding this defect.

Other features and advantages of the invention will appear as the following description proceeds with reference to the attached drawings given by way of example, in the drawings:

FIG. 1 illustrates diagrammatically a device for positioning movable members;

FIG. 5 is a diagram illustrating the mode of positioning of the machining unit by means of a single pick-up device;

FIG. 6 is an explanatory diagram illustrating the performing of several machining operations with respect to a reference face having a shape defect;

Figure 2:
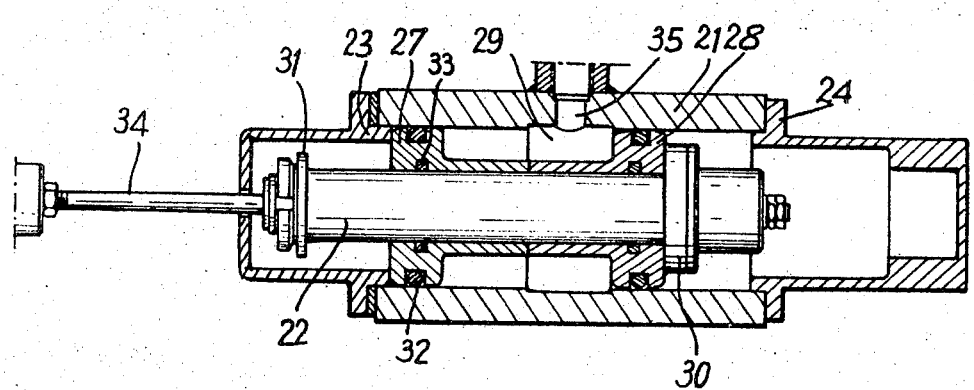
FIG. 2 is a sectional view of a centering device having its cylinder in its endmost right-hand position.

In the device illustrated in FIG. 1, it is assumed that certain machining operations performed by the machining unit 1 on the top surface 2 of a workpiece 3 must be positioned with respect to the direction $d$ at right angles to the side faces 4 and 5, some of these operations being located in relation to reference face 4 and others in relation to reference face 5.

The machining unit 1 is carried by a slide 6 rigid with the support 7 perpendicular to the side faces 4 and 5 of the workpiece.

A screw 8 parallel to said direction $d$ is adapted to slide freely in a plain bearing 9 and in s splined bearing 10 both carried by said support 7.

The assembly secured to said support 7 and consisting of the motor 11 angularly rigid with said splined bearing 10 and of the position pick-up unit 12 is adapted to impart any desired angular position to said screw 8.

The nut 13 carried by said screw 8 is rigid with the machining unit 1 and adapted to move same in the direction $d$ to a predetermined longitudinal position corresponding to an angular position of said screw 8.

A pair of centering devices 14, 14' shown diagrammatically in FIG. 1 are adapted to ensure an accurate axial positioning between the screw 8 and a feeler 15, or between said screw 8 and another feeler 15', said feelers 15 and 15' constantly engaging the right-hand and left-hand reference faces 4 and 5, respectively, of said workpiece 3.

The centering devices 14 and 14' are identical with each other. As clearly apparent from FIGS. 1, 2 and 3, each centering device comprises a cylinder 21, a stem 22, two cylinder bottoms 23 and 24, and a pair of free pistons or spools 27, 28 sealing the chamber 29 with respect to the cylinder 21 and stem 22 with the assistance of piston packings 32 and 33.

The free movements of said pistons 27 and 28 are limited on the one hand with respect to the cylinder 21 by the cylinder bottoms 23 and 24, and on the other hand with respect to the stem 22 by the stem collars 30 and 31. In the specific form of embodiment illustrated the stem 22 acts as a bearing to a rotary rod 34 but it is clear that it could as well be simply linked to a non-rotary movable member.

The introduction of fluid under pressure through a port 35 into chamber 29 is attended by the movements of pistons 27 and 28 away from each other. Thus, piston 27 moves backwards until it bears against the cylinder bottom 23 and also on the stem collar 31, the other piston 28 moving back likewise until it engages the cylinder bottom 24 and the stem collar 30. Thus, the stem 22 is positioned with precision in the axial direction with respect to the cylinder 21. The pressure fluid action counteracts any relative shifting between cylinder 21 and stem 22.

Figure 3:
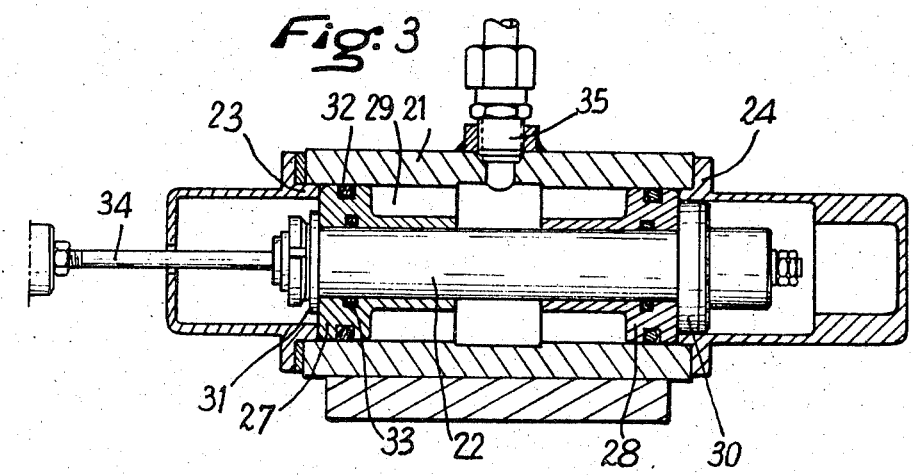
FIG. 3 is a similar view of the same device, with its cylinder in its position of equilibrium.
Figure 4:
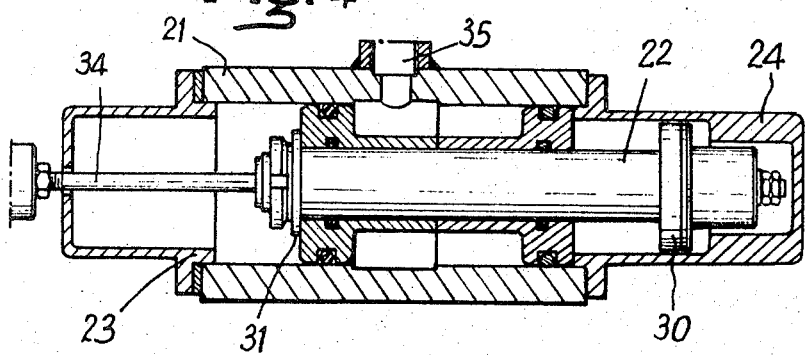
FIG. 4 is a similar view of the same device with its cylinder in its endmost left-hand position.

The release of the fluid pressure in chamber 29 will permit a relative off-setting between cylinder 21 and stem 22 to the limit position shown in FIGS. 2 and 4.

Under these conditions, this device permits, by means of a remote control action, to produce a relative shift between the cylinder 21 and the stem 22, and to rigidly couple these two elements with each other.

The stem 22 is connected in the axial direction to the screw 8 through the rod 34, the latter being adapted to rotate freely through a set of radial and axial bearings (not shown). The centering devices 14 and 14' have their cylinders 21 rigidly connected to feelers 15 and 15', respectively.

Thus, when the centering device 14 is pressurized and the pressure in the other centering device 14' is released, the screw 8 assumes a reference position on face 4, i.e., its origin 16 becomes co-planar with this reference face 4, and conversely when the first centering device 14 is not under pressure and the second centering device 14' is pressurized, the screw 8 is positioned with respect to face 5, its origin 17 becoming coplanar with this reference face 5.

The above-described device operates as follows:

REFERENCE 1

To obtain the $Y_1$ positioning the centering device 14 must be operated while the other centering device 14' remains free, and this positioning operation is obtained by means of the assembly comprising the motor 11, and pick-up 12, the latter giving an information as to the axial position of the nut, the pitch of screw 8 being known.

The pick-up 12 must necessarily give a "zero" information when the machining tool lies in the plane of face 4, the increasing positive values corresponding to a travel performed from face 4 to face 5.

REFERENCE 2

To obtain the $Y_2$ positioning the centering device 14' must be operated while leaving the centering device 14 free, and the assembly comprising said motor 11 and pick-up 12 must be positioned.

Two methods may be applied for this purpose:

a. Utilizing two pick-ups such as 12.

The "Reference 1" case then relies on a first pick-up 12.

To position the assembly with respect to "Reference 2", it is only necessary to utilize a second pick-up 12 showing a "zero" position when the tool lies in the plane of face 5, the increasing positive values corresponding to a movement accomplished from face 5 to face 4.

b. Utilizing a single pick-up 12 (FIG. 5).

If the theoretical distance between pick-ups 15 and 15' is A when the two centering devices 14 and 14' are under pressure, it is only necessary to obtain the positioning $Y'_1 = A - Y_2$ for obtaining in practice the desired $Y_2$ positioning.

MEMORIZING ANYONE OF THE ORIGINS INVOLVED

Assuming (FIG. 6) that several machining operations are to be performed in succession in sections $Xn$, $X(n+1)$, $X(n+2)$, $X(n+3)$ If the above-described principle concerning the reference to Face 4 is adhered to, the various machining operations, as far as their relative positions are concerned, are subjected to the influence of the shape defect of this reference face. This may prove very detrimental for example in case of assembling or coupling with another workpiece machined without such error.

To avoid this defect, it is only necessary to use only the "Reference 1" for the first machining operation 1 $(n)$; for the next machining operations the references are: $1(n+1)'$, $1(n+2)'$..., after memorizing $1(n)$.

The same applies to "Reference 2".

The memorizing device according to this invention comprises:

A jaw 18 axially coupled to said screw 8 and adapted to be clamped for example by hydraulic means at any point along a blade 19 rigid with said support 7.

To perform the series of machining operations mentioned hereinabove in sections $Xn$, $X(n+1)$, $X(n+2)$, ... it is only necessary to set the centering device 14 under pressure for obtaining the first positioning in section $Xn$; before leaving this section, the centering device 14 must be released and the jaw 18 must be pressurized. Thus, the scew 8 remains stationary in the transverse direction, irrespective of the movements in the direction X.

Figure 10:
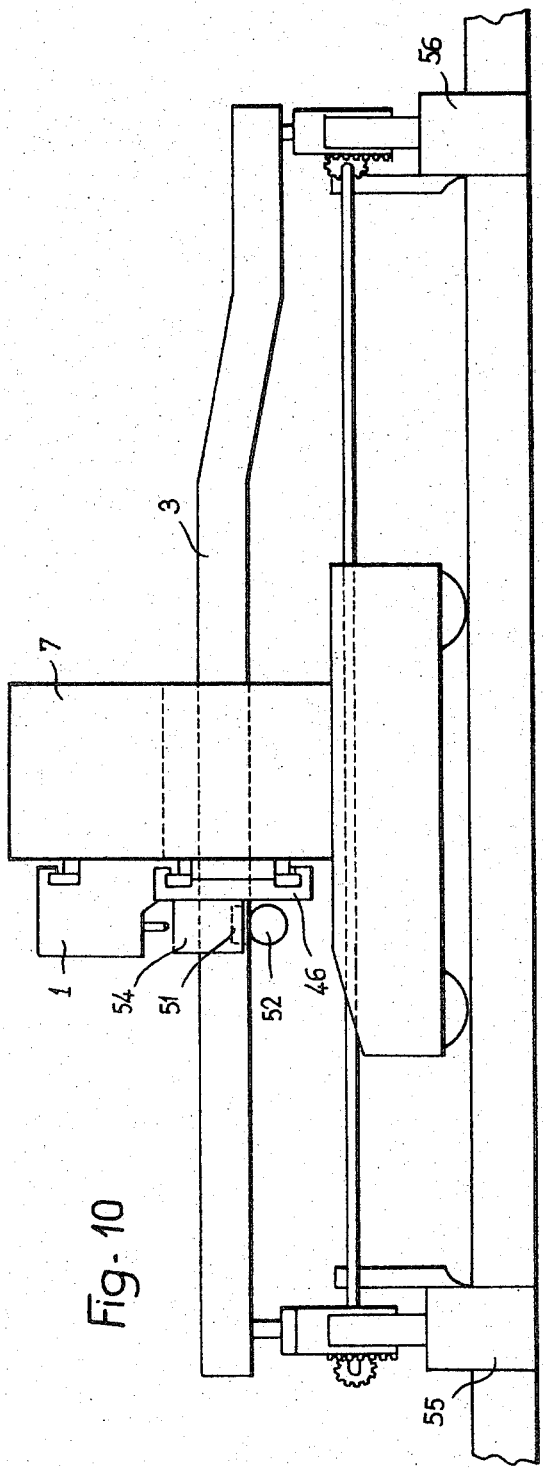
FIG. 10 is a side elevational view of the device illustrated in FIGS. 8 and 9.
Figure 8:
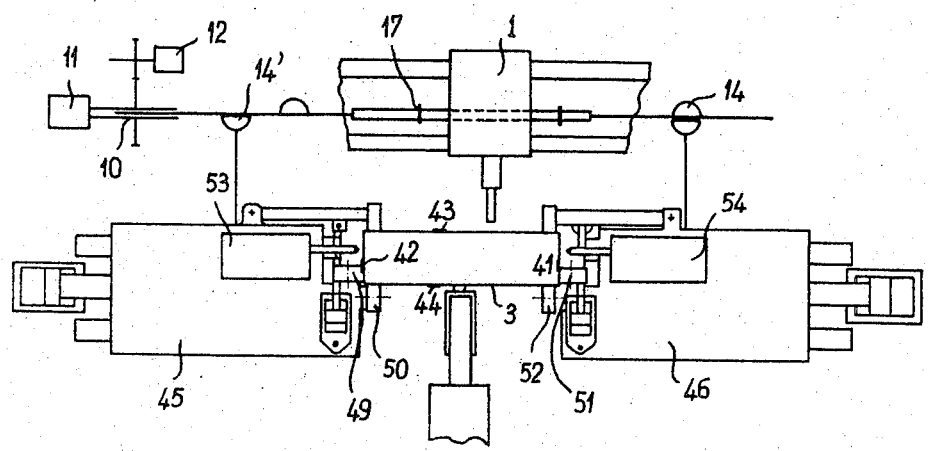
FIG. 8 illustrates diagrammatically a typical form of embodiment of the device for machining a non-rectilinear workpiece having a variable cross-sectional contour.
Figure 9:
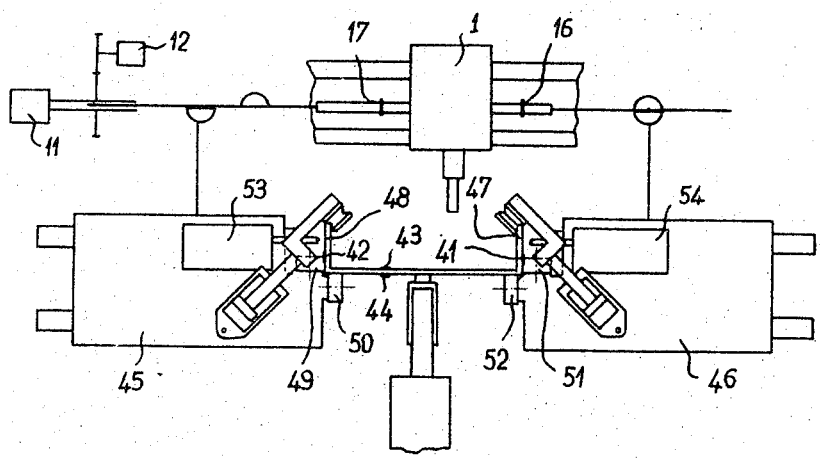
FIG. 9 illustrates the same device as in FIG. 8, the workpiece consisting however of a winged section member.

The device illustrated in FIGS. 8, 9 and 10 permits of maintaining an accurate transverse contact along a workpiece, whether rectilinear or not, and having for instance a variable cross-sectional contour; this contact may take place under a pressure as high as desired.

The lower or bottom longitudinal surface of the workpiece is one portion of a cylindrical surface determined by any directrix having its generatrices perpendicular to the plane V. Each lateral surface is one portion of cylindrical surface determined by any directrix and having its generatrices perpendicular to the plane H (see FIG. 7).

Figure 7:
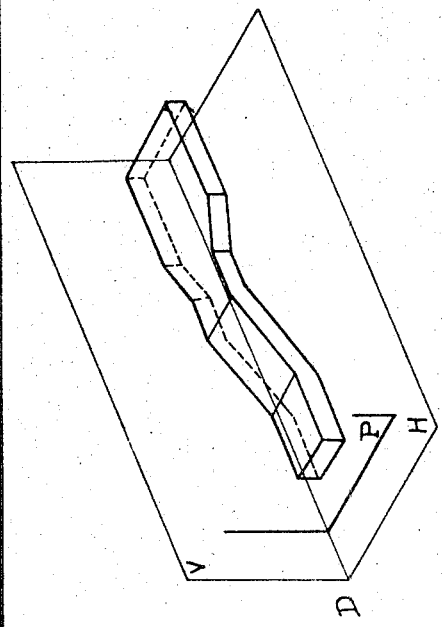
FIG. 7 is a typical three-dimensional illustration of a workpiece.

In FIG. 7, there is a plane P perpendicular to the straight line D formed by the intersection of planes V and H. In each section of the workpiece, determined by the plane P moving along the straight line D, the contacts contemplated are materialized by dihedrons 41, 44 and 42, 44 (FIG. 8).

The workpiece 3 bears on synchronized telescopic supports 55 and 56, thus, the straight line D remains constantly parallel to itself (FIG. 10).

A movable structure travelling along the straight line D carries a pair of carriages 45 and 46 moving freely on their slideways perpendicular to D. Each carriage comprises a dihedron consisting of a pair of perpendicular rollers 49, 50 and 51, 52 (FIG. 8).

The contact between the workpiece and the dihedron is obtained by virtue of elastic pressures for example of hydraulic origin.

Thus, the carriages 45 and 46 supporting the machining units 53 and 54 respectively are resiliently urged and capable of absorbing with any risk of recoil the working reaction of the machining units supported thereby.

The supports are not compulsorily of telescopic character and synchronised if the bottom surface of the workpiece is flat.

If the workpiece has a winged cross-sectional contour (for example as an I or H) the carriages 45 and 46 may be simply anchored to the wings 47 and 48 (FIG. 9).

If the workpiece has a constant, rectilinear cross-sectional contour, it can be rendered longitudinally movable and in this case the support of carriages 45 and 46 are fixed.

This method is attended by several advantages:

The carriages 45 and 46 are at all times in direct engagement with the workpiece, so that:

the thrust resulting from the working operation performed by the units 53 and 54 rigid with said carriages 45 and 46 respectively cannot produce any transverse movement of the workpiece or carriages;

the machining operations performed by said units 53 and 54 are positioned with accuracy in relation to the face 44;

it is only required to refer to one of said carriages 45 or 46 for positioning with precision, in relation to the face 41 or 42, respectively, the machining operations produced by another unit. In this case, it may be necessary to lock one of the carriages 45 or 46 to prevent the workpiece from moving in relation to said carriages.

Although a specific form of embodiment of this invention have been described hereinabove and illustrated in the accompanying drawing, it will readily occur to those skilled in the art that various modifications and changes may be brought thereto without departing from the scope of the invention as set forth in the appended claims.

I claim:

1. A device for controlling the position of movable elements of machines for machining elongated workpieces with the lateral side faces of the workpiece to be machined being reference sides, said device comprising:
    a support disposed to surround a workpiece to be machined,
    a vertical machining unit for machining a workpiece,
    means for guiding said unit to cause said unit to be movable and positionable in a direction transverse to the longitudinal axis of the workpiece to be machined, and
    means for changing the position of said unit from a position relative to one reference side to a position relative to the other reference side for performing a machining operation on a selected portion of the workpiece,
    said means for changing comprising:
        a centering device adjacent each lateral side of a workpiece to be machined for producing an accurate position of the unit relative to the respective side face and
        a feeler connected to each centering device adapted to abut a respective side face of the workpiece to be machined,
        each centering device comprising two portions movable relative to each other, one portion of each centering device being connected to its respective feeler and the other portion of each centering device being connected to the machining unit so that when the machining unit is desired to be positioned relative to one of the reference sides the two movable portions of the centering device on that side are positioned in a specific orientation relative to each other.

2. The device of claim 1 further comprising:
    a screw,
    said unit being connected to said screw and being adjustably positionable relative the longitudinal axis thereof between two spaced points therealong.

3. The device of claim 1 wherein:
    a pair of carriages equipped with other machining units are mounted for horizontal sliding movement on said support, each carriage being associated with a respective side of a workpiece to be machined and comprising a pair of rollers perpendicular to each other for engaging a respective side and adjacent bottom portion of a workpiece to be machined.

4. The device of claim 1 wherein:
    the position of said unit relative to the reference sides are selected origins, and
    said device further comprises means for memorizing the selected origins.

5. The device of claim 4 wherein:
    the memorizing means comprises means for locking the position of the unit relative to said support.

6. The device of claim 5 further comprising:
    a screw,
    said unit being connected to said screw and being adjustably positionable relative to the longitudinal axis thereof between two spaced points thereon.

7. The device of claim 6 wherein:
    the locking means comprises a jaw axially connected to said screw and clampable to portions of a blade rigid with said support.

* * * * *